Dec. 30, 1930. E. L. DELANY 1,786,483
APPARATUS FOR MAKING COMPOSITION RUBBER FLOAT VALVES
Filed April 11, 1927
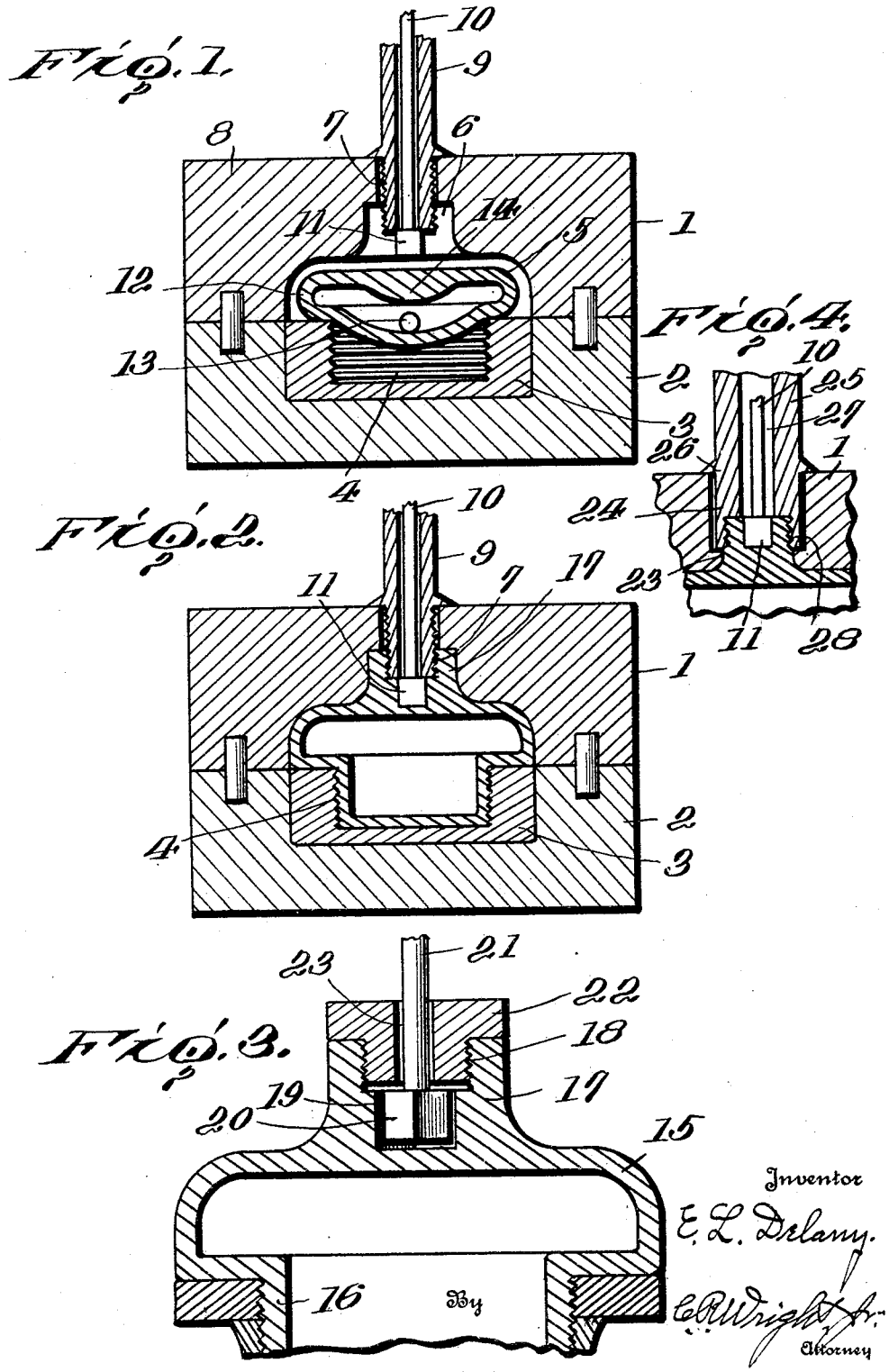

Patented Dec. 30, 1930

1,786,483

UNITED STATES PATENT OFFICE

EDWARD L. DELANY, OF BROOKLYN, NEW YORK

APPARATUS FOR MAKING COMPOSITION RUBBER FLOAT VALVES

Application filed April 11, 1927. Serial No. 182,916.

My invention relates to improvements in apparatus for making composition rubber float valves.

The object of my invention is to provide apparatus whereby a composition rubber float valve can be made by a single operation and whereby means are provided for attaching the lifting rod thereto so that it will have a universal or movable connection therewith.

Another object of my invention is to provide apparatus whereby the composition rubber float valve can be formed in a single operation and providing means whereby a guide may be attached to the lower end thereof.

A further object of my invention is to provide a simple, cheap and effective apparatus whereby the above results may be accomplished.

In the accompanying drawings:—

Figure 1 is a vertical sectional view of the mold whereby my method may be carried out, and showing the composition rubber bag therein ready to be expanded to form my improved composition rubber float valve.

Figure 2 is a vertical sectional view of the mold similar to Figure 1 showing the rubber bag expanded and formed into a float valve.

Figure 3 is a vertical sectional view of the upper end of the float valve formed by my improved method and apparatus.

Figure 4 is a vertical sectional view of the upper end of the mold for making a modified form of float valve.

In the manufacture of float valves, it is well known in the art to use a rubber composition bag in a mold, and placing in the bag a ball of ammonia, which when heated, throws off a gas which expands to conform with the shape of the mold, thus forming a float valve corresponding in shape to the mold, which is vulcanized by heating the mold.

My improved method and apparatus consists of a mold formed in two sections 1 and 2, the lower section 2, having an insert 3 arranged therein, which is provided with an internally threaded recess 4, whereby the lower end of the float valve is formed with an externally threaded reduced portion. The upper section 1 of the valve is provided with a recess 5, which may be of any desired shape according to the form of valve to be made, and is provided with a reduced recess 6 at its upper end and having an opening 7 communicating therewith, and extending out through the upper wall 8 of this section. This recess 7 is internally threaded and into which passes a tube 9 which extends inwardly beyond the upper wall of the recess 6. The tube 9 before it is screwed into the section 1 of the mold has a rod or stem 10 placed therein, which carries at its lower end a rectangular enlarged portion 11, which forms a correspondingly shaped cavity in the float valve, as will be hereinafter more fully described. Before the sections 1 and 2 of the mold are assembled a bag 12 of a soft rubber composition containing a ball of ammonia 13 is placed on the lower section 2 of the mold, and the upper section is placed thereon as fully shown in Figure 1 of the drawings. This bag 12 of soft rubber composition is provided at its upper end at the center with the thickened portion 14 for a purpose hereinafter more fully described. Before the upper section 1 is placed in position the tube 9 is screwed therein, and the rod 10 adjusted so that the rectangular member 11, carried by the lower end of the mold, is in the position shown in Figure 1 of the drawings to close the lower end of the tube. When the two sections of the mold 1 and 2 have been assembled in the position shown in Figure 1 of the drawings, heat is applied to the mold, which causes the ball of ammonia 13 to throw off a gas which will expand under the heat and cause the bag to expand outwardly so that it will assume the shape of the interior cavities of the sections 1 and 2, and the heat will vulcanize the rubber composition bag so that it will maintain its shape as will be readily understood by those skilled in the art. After the ball valve has been vulcanized to the desired degree it is allowed to cool and after it is cooled the tube 9 is unscrewed from section 1 of the mold and the rod 10 is removed carrying with it the rectangular member 11. By this method and apparatus it will be seen that I have provided a float valve having the body portion 15 provided with the downwardly extending reduced externally threaded portion 16 and the upwardly extending thickened neck portion 17 provides with an internally threaded recess 18. The lower end of the recess 18 has communicating therewith the rectangular recess 19 in which is loosely mounted the correspondingly shaped nut 20 to which is connected the lifting rod 21. A cap 22 is screwed into the internally threaded recess 18 into which is screwed the cap 22 having an opening 23 therethrough, and through which the lifting rod 21 loosely passes.

While I have shown and described this particular shape of float valve it will be understood that the same could be varied without departing from my invention. The main object of the method and apparatus is to provide the particularly shaped recess in the upper end for attaching the lifting rod thereto, so as to have a universal connection with the float valve.

In the modification shown in Figure 4, the upper section 1 of the mold is provided with an opening 23 therethrough, and enlarged at its upper end as indicated at 24. The member 25 is provided with a flange 26 for supporting the same in the opening of the mold, and is provided with an opening 27 extending therethrough having at its lower end an enlarged internally threaded portion 28. The rod 10 and rectangular member 11 are arranged exactly like that shown in Figures 1 and 2 of the drawings.

From the above description it will be seen that the thickened upper portion of the float valve is externally threaded and provided with a rectangular recess.

Having thus fully described my invention what I claim is:

1. A mold for making composition rubber float valves comprising sections, one section having a removable member having a threaded portion extending into the cavity of the mold, and a rectangular member carried by the member at its lower end and independently movable.

2. A mold for making composition float valves comprising sections, a removable member threaded into one of the sections and extending into the cavity of the mold, an angular member below the lower end of the member and having a stem extending into the member whereby the tube can be moved independent of the stem.

3. A mold for making composition float valves comprising sections, one section having a removable threaded member having its lower end extending into a cavity of the mold, a stem passing into the member, and an angular member carried by the lower end of the stem below the member and closing the lower end thereof.

4. A mold for making composition float valves comprising sections having cavities to correspond with the shape of the float valve, a threaded member extending into one of said sections and extending a distance into a cavity of a section, a stem extending into the threaded member, and an angular member carried by the lower end of the stem below the member and closing the lower end of the member.

5. A mold for making composition float valves comprising sections having arranged cavities to correspond with the shape of the float valve, a member extending into a cavity of one of the sections and having its lower end threaded, and a member extending into the tube and carrying an angular member below the lower end of the member, whereby a thread and a rectangular cavity is formed.

6. A mold for making rubber float valves comprising sections, one section having a removable screw threaded member extending into the cavity of the mold and an angular member removably carried by the lower end of the threaded member.

7. A mold for making rubber float valves comprising sections, one section having a removable screw threaded member extending into the cavity of the mold, an angular member carried by the lower end of the threaded member, and another section of the mold having a threaded portion arranged opposite the screw threaded member.

8. A mold for making composition rubber float valves, comprising sections, one section having removable member having threaded portions extending into the cavity of the mold, and a member carried by the threaded member at its inner end and independently removable, and of a shape to prevent the turning thereof within the valve.

9. A mold for making composition rubber float valves, comprising two sections, one section having a threaded cavity and the other section having a removable threaded member extending into the cavity of the mold and a member carried by the threaded member at its inner end and independently removable and of a shape to prevent the turning thereof within the valve.

10. A mold for making composition rubber float valves, comprising two sections, one section having a threaded cavity therein and the other section having a removable screw threaded member extending into the cavity of the section and a member carried by the screw threaded member at its inner end independently removable.

In testimony whereof I have signed this specification.

EDWARD L. DELANY.